March 11, 1924.

G. M. PETERS

CUSHION WHEEL

Filed Sept. 13, 1920

Witnesses
John C. ...

Inventor
George M. Peters
...
Attorney

March 11, 1924.                G. M. PETERS                1,486,679
                               CUSHION WHEEL
                           Filed Sept. 13, 1920        2 Sheets-Sheet 2

Patented Mar. 11, 1924.

1,486,679

UNITED STATES PATENT OFFICE.

GEORGE M. PETERS, OF KIRKWOOD, MISSOURI.

CUSHION WHEEL.

Application filed September 13, 1920. Serial No. 409,929.

*To all whom it may concern:*

Be it known that I, GEORGE M. PETERS, a citizen of the United States, residing at Kirkwood, in the county of St. Louis and State of Missouri, have invented new and useful Improvements in Cushion Wheels, of which the following is a specification.

My invention relates generally to resilient wheels, and more particularly to wheels of this type in which the resilient element is in the form of a spring pressed plunger inserted within the tubular spokes of the wheel. According to my invention antifriction means are employed in connection with the plungers so that the radial and rotational movements of the same may be accomplished with little friction and almost solely under the influence of the yielding action of the resilient means.

The invention consists especially in the novel and peculiar combination of parts and details of construction as hereinafter described and then pointed out in the claims.

In the drawings which serve to illustrate the preferred forms of my invention:—

Figure 1:
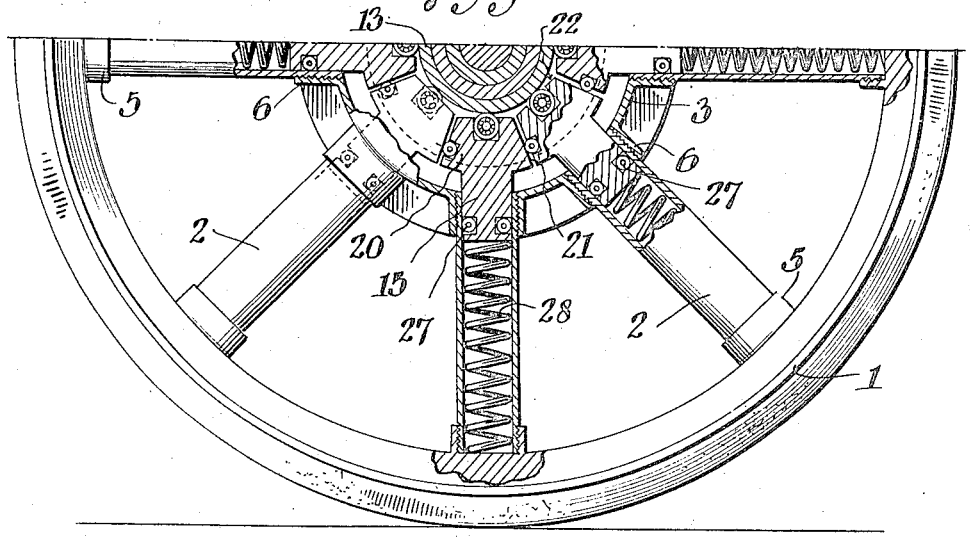
Figure 1 is a partial elevation and partial sectional view of one form of my invention utilizing plungers having wedge-shaped heads.
Figure 3:
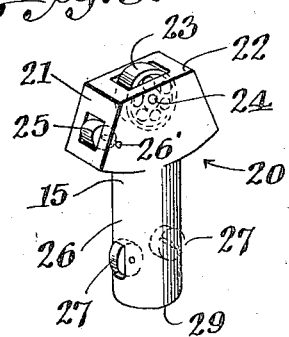
Figure 3 is a detail of one of the wedge-shaped plungers.

The spring wheel includes a rim portion 1 and a hub portion 3 connected by the tubular spokes 2. The spokes 2 are preferably threaded at each end for engaging with socket members 5 of the rim and spoke engaging part of the hub respectively. The hub is formed with the spoke engaging part 6 and an axle portion 7. The latter includes a sleeve 8 fixed to the axle 9 of the vehicle and provided with an inside flange 10. A sleeve 11 is screw threaded on the exterior of the sleeve 8 and is also provided with a flange extension 12. A bushing 13 tightly pressed on the exterior of the sleeve 11 is provided with flange 14, which is spaced from the flange 12 for the purpose of receiving the plungers 15 therebetween.

The spoke engaging portion 6 of the hub is formed with interior and exterior side plate extensions 16 and 17, the former of which is adapted to move radially between the spaced flanges 10 and 12 while the latter moves similarly between the flange 14 and a plate 18 which is retained in place by the nut 19 threaded on the end of shaft 9. The plungers 15 are formed with heads 20 having coacting wedge shaped surfaces 21 and a flat terminal surface 22. A recess is formed in the head through the surface 22 and a roller bearing 23 is inserted in this recess and journalled on a transverse pin 24. The diameter of the roller 23 is such that the periphery thereof extends beyond the surface 22 and engages the bushing 13. A roller bearing 25 inserted in a recess passing through one of the surfaces 21 is journalled on a pin 26'. The periphery of this roller 25 projects beyond the wedge-shaped surface and contacts with the adjacent surface of the next plunger head. The plunger 15 is also formed with a stem 26 which projects into the tubular spokes and is equipped with rollers 27 which engage the interior of the spokes and thereby reduce friction due to the radial movement of the plunger. A coil spring 28 inserted within the tubular spoke bears at one end against the end 29 of the plunger stem and at the other end against the rim. From this structure it is apparent that the axle 9 is resiliently supported on the spring pressed plunger heads 20.

Figure 4:
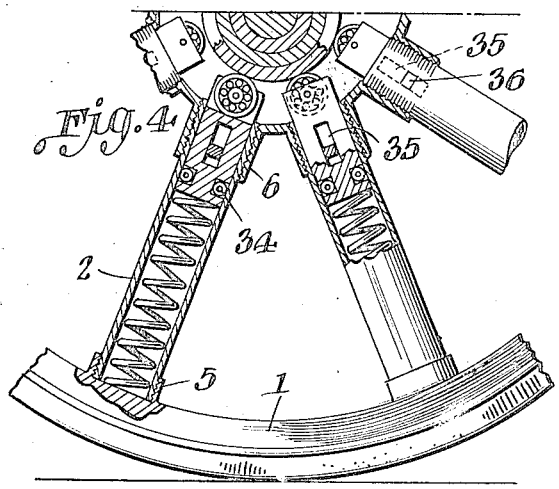
Figure 4 is a partial sectional view of a modified form of my invention.
Figure 6:
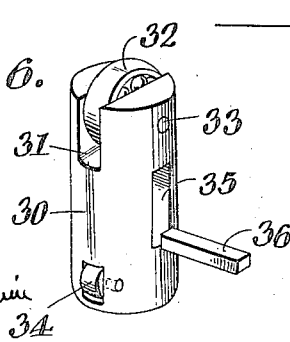
Figure 6 is a detail perspective view of a modified form of plunger used in connection with the modification shown in Figure 4.
Figure 2:
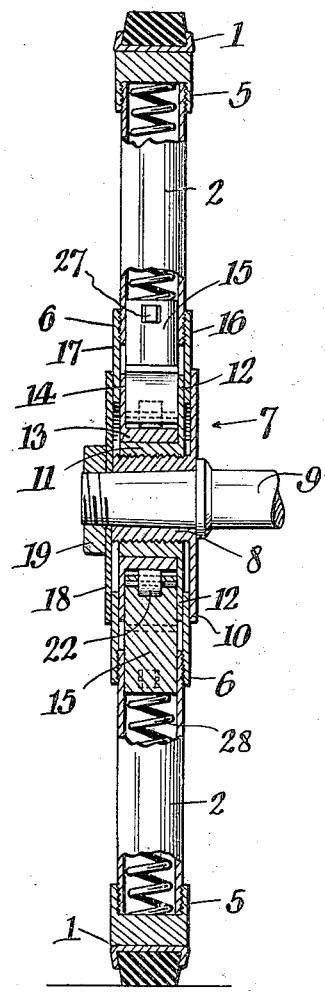
Figure 2 is a central vertical section through one of the spokes of the wheel illustrated in Figure 1.
Figure 5:
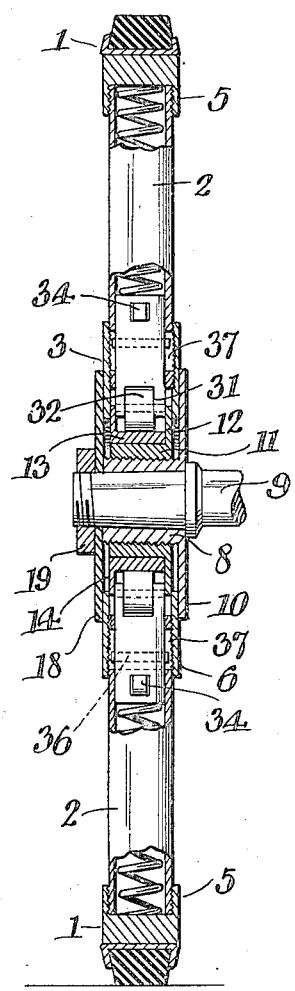
Figure 5 is a vertical section through one of the spokes of the wheel illustrated in Figure 4.

In the form shown in Figures 4, 5, and 6 a slightly different type of plunger is used inasmuch as the plunger is cylindrical in shape. Each cylindrical plunger 30 is provided with a recess 31 at one end adapted to receive the roller bearing 32 mounted on the transverse shaft 33 passing through the segments of the member 30 adjacent to the recess. The roller 32 extends beyond the end of the plunger and engages the axle portion of the hub. The plungers 30 extend into the tubular spokes of the wheel and are formed with recesses for receiving rollers 34, which contact with the inner walls of the spoke to reduce friction due to the radial movements of the plungers. The plunger is also provided with a slot 35 extending entirely through the same and a pin 36 is inserted through this slot and a corresponding slot 37 made in the spoke of the wheel for the purpose of guiding the plunger in its radial movements and limiting the extent of such movements.

In operation the plungers shown in the first form of my invention move radially outwardly under excessive pressure and compress the springs 28. The plungers are guided in this movement by the spokes and coacting rollers 27 at one end and by the coacting plunger heads at the other end, the spoke engaging part 6 limiting the extent of the outward movement of the plungers. In the form shown in Figures 4, 5 and 6 the plungers are guided in their radial movements by the spokes and coacting rollers 34 and the pins 36 which engage the slots 35, the latter also acting to limit the outward movement of the plunger.

The invention has been shown in connection with the front wheel of a vehicle and it will be understood that when the vehicle is in motion the rollers 23 or 32 roll on the axle portion of the hub. However, the construction is also adapted to be used with the rear or driving wheels of a motor vehicle, in which case it is preferred that a connection similar to that illustrated in my application Serial No. 158,728, filed March 30th, 1917 should be employed, although other forms of suitable driving connections will occur to those skilled in the art to which this invention appertains.

I claim:—

1. A resilient wheel for vehicles comprising a hub having an axle portion and a spoke engaging part, a rim, and tubular spokes connecting said spoke engaging part and rim, and spring pressed plungers radially movable in said spokes, said plungers being provided with coacting wedge-shaped heads for guiding the plungers and having roller bearings mounted thereon for engaging adjacent plunger.

2. A resilient wheel for vehicles comprising a hub having an axle portion and a spoke engaging part, a rim, tubular spokes connecting said spoke engaging part and rim, spring pressed plungers radially movable in said spokes, said plungers being provided with heads having wedge-shaped surfaces, anti-friction means mounted in each head adapted to bear against the wedge-shaped surface of the adjacent head and roller bearings mounted in said heads for engaging said axle portion.

3. A resilient wheel for vehicles comprising a hub having an axle portion and a spoke engaging part, a rim, tubular spokes connecting said spoke engaging part and rim, spring-pressed plungers radially movable in said spokes, wedge-shaped heads on the plungers adapted to co-act for guiding the latter during the reciprocating movements thereof, rollers upon said plungers engaging the inner walls of the spokes.

4. A resilient wheel for vehicles comprising a hub having a portion mounted on an axle of the vehicle and provided with pairs of inboard and outboard flanges and a spoke-engaging part having side plate extensions interposed between each pair of flanges and radially movable relatively thereto, a rim, a plurality of tubular spokes connecting said rim and the hub part, plungers adapted to reciprocate in said spokes, said plungers having side and end recesses formed therein, roller bearings mounted in said recesses for engaging the spokes and said hub respectively, and spring means acting between said rim and plungers for yieldingly supporting the axle portion.

5. A resilient wheel for vehicles comprising a hub having a portion mounted on an axle of the vehicle and provided with pairs of inboard and outboard flanges and a spoke-engaging part having side plate extensions interposed between each pair of flanges and radially movable relatively thereto, a rim, a plurality of tubular spokes connecting said rim and the hub part, plungers adapted to reciprocate in said spokes, said plungers having side and end recesses formed therein, roller bearings mounted in said recesses for engaging the spokes and said hub respectively and spring means acting between said rim and plungers for yieldingly supporting the axle portion.

In testimony whereof I have hereunto set my hand in presence of two subscribing witnesses.

GEORGE M. PETERS.

Witnesses:
J. W. HARPER,
J. KLEM.